METHOD OF PROCESSING MAGNETIC CORES

Filed Dec. 31, 1954 3 Sheets-Sheet 1

*INVENTOR.*
VICTOR V. DAMIANO
*BY* Laurence R. Brown
ATTORNEY

Dec. 1, 1959 V. V. DAMIANO 2,914,840

METHOD OF PROCESSING MAGNETIC CORES

Filed Dec. 31, 1954 3 Sheets-Sheet 2

INVENTOR.
VICTOR V. DAMIANO

BY Laurence R. Brown

ATTORNEY

METHOD OF PROCESSING MAGNETIC CORES

Filed Dec. 31, 1954 3 Sheets-Sheet 3

*INVENTOR.*
VICTOR V. DAMIANO

*BY* Laurence R. Brown

ATTORNEY

United States Patent Office 2,914,840

Patented Dec. 1, 1959

2,914,840

METHOD OF PROCESSING MAGNETIC CORES

Victor V. Damiano, Philadelphia, Pa., assignor to Burroughs Corporation, Detroit, Mich., a corporation of Michigan Application December 31, 1954, Serial No. 478,994

2 Claims. (Cl. 29—155.57)

This invention relates to methods of manufacturing magnetic cores and more particularly it relates to methods of manufacturing magnetic storage elements having substantially square or rectangular hysteresis characteristics and adapted for switching applications requiring storage of information in binary fashion.

Magnetic cores have been used in the electronic computer art for permanent storage of binary information subject to interrogation by an electrical current pulse at a specified time. Such cores have been used in different types of circuits for bulk memory storage of information, shift register storage, different types of logical circuit operations, and pulse shaping or waveform modification.

In order to store binary information and later read the information out in response to interrogation currents, the cores must have reversible remanent magnetic properties which follow a substantially rectangular or square hysteresis loop. The squareness of the hysteresis loop is one property which indicates the adaptability of the core material for binary storage, since the departure from squareness of the hysteresis loop is a measure of noise generated during the interrogation process when a binary signal is stored of the same polarity as that intended to be established by the interrogating pulse. Accordingly, a core manufacturing process must be such that cores may be produced within an accurately predetermined range of squareness ratios.

In addition to the squareness of the hysteresis loop of the materials, another important property indicating the usefulness of the core material is the time necessary to switch from one storage stage to the other. It is evident that if the switching time is decreased, the core materials may be utilized in systems working at higher frequencies. Therefore, it is generally desirable to be able to accurately select the range of switching times necessary for changing the magnetization of the core material from one polarity to the other during the manufacturing process.

To attain the foregoing properties the core materials have been formed of thin magnetic strip materials wrapped in the form of a coil. In general, it is desirable in any process of manufacturing to provide a high yield of materials which pass certain rigid inspection requirements. Thus, in the magnetic core materials above described, well defined ranges of squareness and switching standards must be set before manufacture begins. However, the manufacture of strip wrapped cores is a delicate process and any slight deviation will materially affect the core properties. Thus, with manufacturing techniques known in the prior art, it has not been possible to produce strip wrapped cores having the squareness and switching characteristics desired with high percentage yields of acceptable cores.

It is, accordingly, a general object of the present invention to provide improved methods of manufacturing magnetic materials suitable for binary storage of information.

It is a further object of the invention to produce strip wrapped magnetic cores with substantially square hysteresis characteristics.

Another object of the invention is to provide magnetic cores for storage of binary information which may quickly be changed from one magnetic polarity to the other in response to an externally generated magnetic field.

A still further object of the invention is to provide a manufacturing process for obtaining a high yield of magnetic cores with predetermined squareness and switching characteristics falling within prescribed limits.

In accordance with a specific embodiment of the invention, therefore, metallic iron-nickel alloys in the form of thin strip materials are wrapped upon ceramic bobbins to form a toroidal core. Each of the several turns or wraps of magnetic strip material is carefully insulated from the adjacent wrap in winding the strip materials about the ceramic bobbins to eliminate deleterious affects due to eddy currents. For this purpose, the strip, before being wrapped on a bobbin, is dipped into an insulating medium flowable under pressure such as a viscous mixture of a carrier such as oil and finely divided magnesium oxide. The strip material is generally precut or premeasured to proper length to accurately gauge the number of wraps of magnetic material in the resulting core, and is then held in position about the ceramic bobbin and wrapped with controlled tightness so that the excess oil-magnesium oxide mixture may be squeezed out between the strip wraps at the edges of the wrapping. By controlling the tightness of wrapping the strip material, and by choosing the ratio of oil and magnesium oxide, the amount of insulating material between the strip wraps may be accurately determined. In the wrapping step it is important that the excess material be squeezed out at the edges of the strip, because otherwise in the subsequent annealing steps the strips would have a tendency to weld at the edges and thereby alter the magnetic properties to result in a decrease in the number of acceptable cores.

After the wrapping operation, the outer two layers of the strip about the core are carefully spot welded to hold the strip in position about the bobbin. An annealing phase is thereafter begun upon the assembled bobbin, at temperatures above the Curie temperature, generally in the range of 700° to 1100° C. for time periods in the order of 30 to 60 minutes depending upon the characteristics desired in the core materials. During this annealing phase, the oil is baked out of the insulating mixture and the retained magnesium oxide produces a stable insulating surface between each of the layers of the strip wrapped core. After the completion of the annealing phase the cores are quenched in a carefully controlled quick cooling step of the manufacturing process. Throughout the annealing and cooling treatment the cores are maintained in a hydrogen atmosphere in order to remove the effect of impurities which will alter the desired magnetic properties. This process produces an acceptable yield of over 90% of finished cores having more closely defined tolerance ranges with respect to squareness and switching times than possible in the prior art. In addition, it is possible by means of this invention to select predetermined core properties in advance and produce cores within a large range of magnetic properties.

Further objects and features of the invention will be found throughout the following more detailed description of the invention. The description of the invention is accompanied by various diagrams in the accompanying drawings, wherein.

Figure 1:
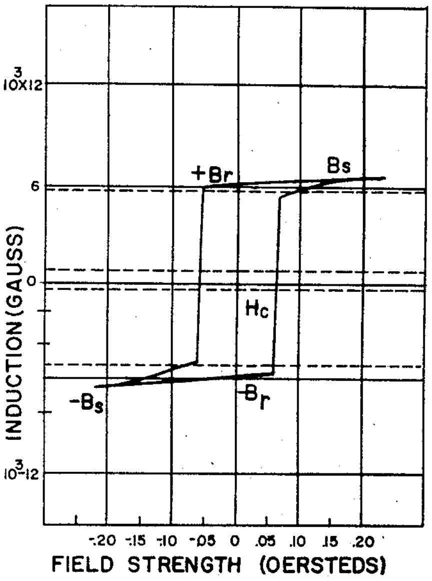
Fig. 1 is a typical hysteresis diagram for magnetic cores, which illustrates features that may be controlled in accordance with the teachings of the present invention.

The hysteresis curve of Fig. 1 is obtained by plotting for a particular magnetic core the field strength against the induction for at least one complete cycle of passing the core from magnetic saturation $B_s$ in one polarity to magnetic saturation $-B_s$ in the other polarity. The magnetic cores of the present invention are bistable cores having the property that if the cores are driven into magnetic saturation and the field is thereafter removed, they will reside in a state of magnetic remanence $B_r$ in that polarity corresponding to the saturation field. Thus, the core may operate as a bistable storage device to retain information in either the $+B_r$ or the $-B_r$ magnetic state. Assume, for example, that the magnetic remanence is in the state $+B_r$ and a saturating field of greater than +.20 oersted is applied thereby driving the core into saturation condition $B_s$. During this operation there is a small change of induction in the core such that a potential would be induced in a winding placed about the core during the change of induction. This potential represents, in most applications of bistable state cores, a noise potential. The amount of noise potential which may be tolerated in any particular application is determined by the engineering design of the circuits in which the core is to be used. It is evident, however, that the engineering design is much more difficult for circuits having a considerable change of induction from $B_r$ to $B_s$, and accordingly a small amount of such induction is a desirable feature in bistable magnetic cores.

It is also evident that cores should be manufactured which fall into a particular range of values, so that the cores may be used in circuits which have been designed for the particular properties exhibited by the cores. Should the cores, however, vary within large ranges, an expensive selection or quality control process after manufacture would be necessary to choose those cores which would be suitable for any particular engineering application. The quality of the cores may therefore be measured in part by the $B_r/B_s$ ration which is hereinafter referred to as the squareness ratio. As the squareness ratio approaches unity therefore the amount of induced noise approaches zero. As will be shown hereinafter in accordance with the manufacturing process steps disclosed by the invention, the squareness ratio may be predetermined to fall within a small range of values by varying the parameters of the process.

In addition, the losses of the core should be small. The general losses are determined by the area enclosed within the hysteresis loop. The main factors contributing to the losses are the eddy currents induced in a core, and the amount of energy which must be used in causing the magnetic domains within the material to rotate from one polarity to another. The latter property depends not only upon the materials used but also upon the manner in which they are processed. Therefore, during the manufacturing of the core process steps must be included both for controlling the eddy currents within the cores, and for producing a core material having low switching energy.

The choice of proper core materials is an important factor in determining the squareness of the core. Two materials have been found suitable in the past for production of metallic cores having the proper magnetic properties. The first material is one of the Permalloy alloys which generally comprises about 20% iron and 80% nickel. This material generally has high permeabilities at low field strengths. The second of these materials is an alloy having about 50% iron and 50% nickel, and is generally known by trade names, such as Orthonik and Delta-max. This material, hereinafter referred to as 50–50, produces high permeabilities at high field strengths. Although both materials may be used in accordance with the present invention to produce accurately defined core properties, there are certain variations in the manufacturing process for realizing the desired properties, which will be discussed in detail hereinafter.

In general, the 50–50 magnetic materials depend upon an initial cold rolling step or other mechanical working in order to produce the proper grain orientation for imparting the properties desired for bistable switching devices. Methods of producing the grain orientation in these materials are well known in the art and therefore will not be discussed hereinafter in detail. However, in order to produce the proper type of bistable storage cores, further processing is required after the initial grain orientation, which will be fully discussed hereinafter.

In the Permalloy materials the desired core properties depend on a crystal structure rather than the grain orientation. Like the 50–50 materials these alloys also require further processing in order to produce adequate cores. Since the processing steps of both base materials are in general similar, the discussion generally will be applicable to both basic core materials and departures therefrom will be noted specifically where pertinent. It is noted that in the Permalloy material the addition of other elements such as chromium or molybdenum is found to increase the specific resistance (resistivity) of the alloy, to increase the permeability, and to reduce the sensitivity to cooling rate through the Curie temperature. Therefore, in the case of Permalloys the alloy proportions are important. One of the most desirable of these alloys has been found to be a 78.5% nickel Permalloy having a molybdenum content of about 4%. It may be assumed hereinafter that this particular Permalloy alloy will produce the results described, and although other alloys may be used, this is a preferred material.

In order to reduce the eddy current losses of the cores the resistivity of the core material should be as high as possible. This is obtained in the case of Permalloys with the addition of molybdenum as hereinbefore discussed. In general, the resistance is raised by decreasing the core's cross section. Therefore, it is desirable to build up cores from extremely thin strip materials. It will also be pointed out hereinafter that the process steps must be varied to produce the same results if the core strip cross section is varied.

The ideal physical form for a magnetic core is a completely closed magnetic circuit in the shape of an annulus, such as a ring or toroid. This reduces the leakage flux about a core which deleteriously affects the desired switching properties. By coiling an extremely thin strip of magnetizable material into the form of a clock spring, a close approximation to the completely closed toroid is attained, and the core has better properties than for a solid toroid because the resistivity is increased enough to substantially reduce eddy currents.

The amount of core material used is an important factor in determining the core properties, and therefore the number of turns or wraps of strip material in a particular core must be carefully controlled. In general, cores made of molybdenum Permalloy having 10 wraps, ¼ mil thick or ⅛ mil thick, are used for obtaining the properties which will hereinafter be described. In general, the decrease of cross section will reduce the eddy currents by increasing the resistance and therefore permit the core to be switched from one storage condition to the other in a shorter period of time. Thus, the thickness of the material is an important factor in determining the switching time which is desired. Similar magnetic properties may be obtained from 50–50 cores having respective ¼ and ½ mil thicknesses. In general, it may be assumed that these materials have been formed in strips ⅛" wide and held within a standard dimensional tolerance of + or −.005".

Figures 2, 3, 4:
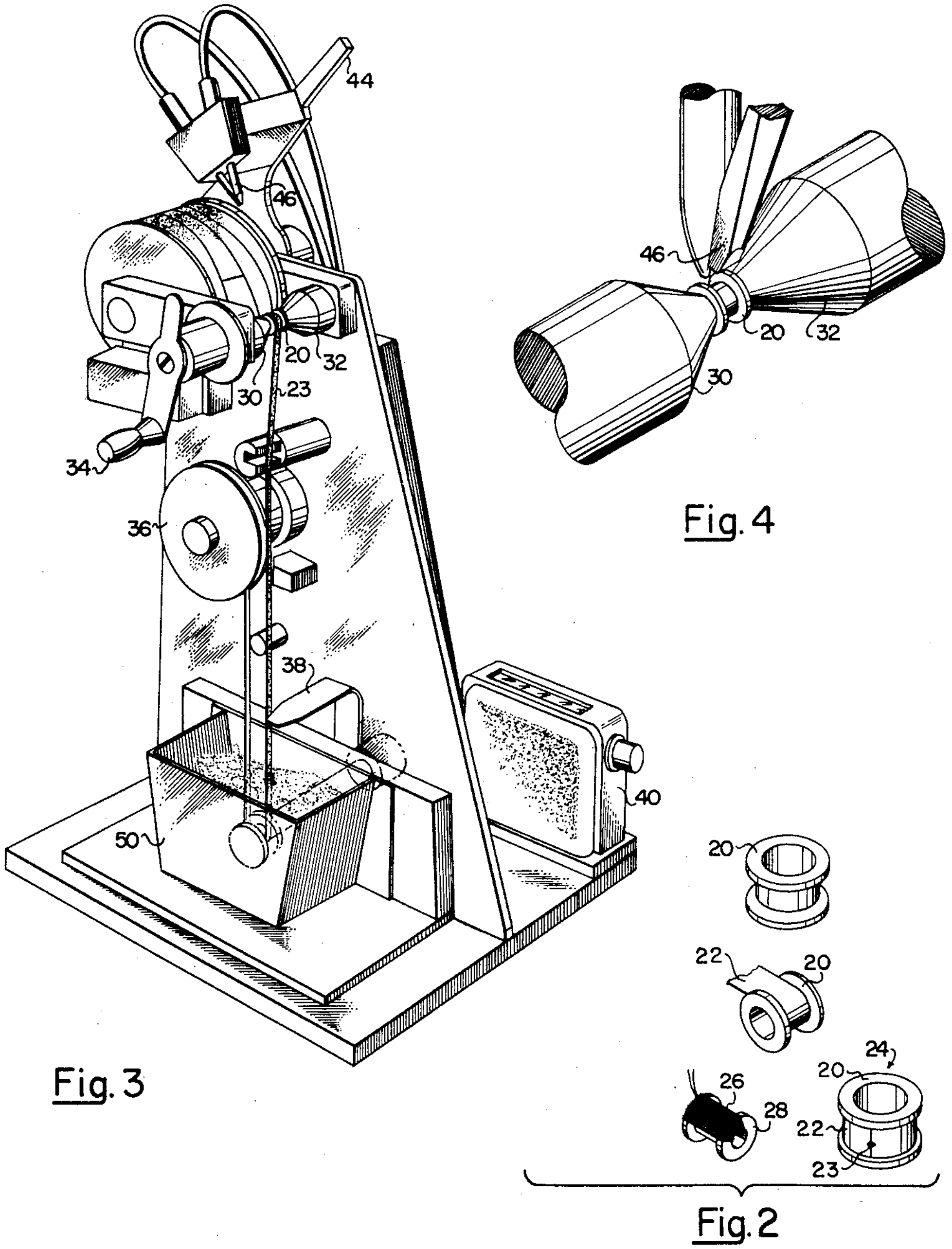
Fig. 2 is a sketch of a magnetic core in different stages of assembly.
Fig. 3 is a perspective view of a machine for wrapping thin magnetic strips about insulating bobbins in accordance with the invention.
Fig. 4 is an enlarged detail perspective view in section of a portion of a spot welding assembly incorporated in the machine of Fig. 3.

In Fig. 2 several cores are shown in various stages of assembly. The magnetic core strip material is wrapped upon a bobbin 20, since a few turns of the very thin strip material are not self supporting and could not be easily handled without damaging the core properties. The strip materials are strain sensitive. That is, if the material is deformed, the desired magnetic properties are materially altered because of either a change in crystal or grain orientation. Therefore, the bobbin 20 provides a form about which the strip material may be wrapped, and which will permit the strip material to be handled without damage. Since the core is to undergo a heat treatment, the ideal bobbin material should have a minimum coefficient of expansion. This is necessary to prevent strains in the core material from expansion, to assure that the wraps of the core will be tightly wound after cooling, and to prevent cracking of the bobbins during the cooling phase. Since impurities in the core materials tend to affect adversely the magnetic properties apparently because they retard the rotation of magnetic domains necessary during the switching process, the bobbin material should not react with the magnetic tape at elevated temperatures. Several ceramic materials such as Stupalith, alumina, and steatite have been used. Alumina is believed to adversely affect the purity of the tape although it possesses considerable resistance to changes in temperature and shock. Steatite bobbins are acceptable if they are not subjected to extremely rapid conditions of cooling. Stupalith, however, supplied by J. Stupakoff, Latrobe, Pennsylvania, may be obtained with a zero coefficient of expansion and it will withstand extremely radical temperature changes without damage.

It is preferable that the bobbin design has deep grooves and rounded edges to prevent tearing or straining of the insulation or windings. In the wrapping process as indicated by the application of the strip material or tape 22 onto the bobbin 20 of Fig. 2, it is essential that the tape be wrapped tightly on the bobbin and held in place. When the strip is tightly wrapped about the bobbin, it may be held in place by spot welding as shown at 23 in the assembled core 24 of Fig. 2. After the strip is wrapped and spot welded it undergoes an annealing and quenching treatment which will be hereinafter described. Thereafter the core material may be provided with one or more conductive windings 26 as shown by the finally assembled magnetic core component 28.

In Fig. 3 is shown a semi-automatic wrapping machine designed to permit a minimum amount of handling of the strip, although the entire wrapping process may be done manually if desired. The machine is described and claimed in the copending application of Charles B. Hebeler for "Method of Winding a Magnetic Tape on a Non-Magnetic Spool," filed at the same time as this application. The ceramic bobbin 20 is clamped between separable conically shaped jaws 30 and 32 which together form a spindle manually rotatable by the crank 34. The tape 22 may be unwrapped from the reel 36 and started on the bobbin 20 and thereafter wrapped by means of a crank 34 until the required number of wraps are placed upon the bobbin 20. The tightness during wrapping may be controlled by adjusting the tension of the reel 36.

Since it is difficult to tell when slippage occurs during the wrapping process, it is generally desirable to measure and cut the strip in a predetermined length. Thus, the extended arm 38 might be used to slightly mark the tape 22 as extended between the bobbin 20 and arm 38 to assure that the tape is cut in the exact length for the required 10 turns. If it is assured that there is no tape slippage during the wrapping process, or the number of wraps becomes large, the counting device 40 may be coupled with the spindle in order to count the number of wraps upon the bobbin.

After the desired length of the magnetic strip 22 is fully wrapped about the bobbin 20, the strip is held tightly in place by a spot weld between the two layers of the outside wrap. The insulation may be cleared from the end of the strip before welding. In general the insulation between strip layers serves to prevent welding of more than the one outside wrap. This welding step is controlled by lowering the handle 44 so that the electrodes 46 contact the end of the strip and the immediately adjacent lower wrap contiguous with the end of the strip. As is evident in the detailed view of Fig. 4, the right hand welding electrode, applied to the next lower wrap of the strip adjacent to the end of the strip (after the end of the premeasured strip has passed upwardly over the right side of the underlying wraps as viewed in Fig. 3), has much greater area in contact with the strip than does the left hand electrode under which the spot weld 23 is formed. A mechanical stop may be provided for adjusting the electrode contact pressure. In this manner the pressure of the electrodes upon the strip may be carefully controlled, both for the purpose that deformation of the strip will alter the magnetic properties and because too heavy pressure results in the welding of more than one wrap of the material to thereby not only alter the magnetic properties but also to increase the eddy current losses. In the tank 50 is an insulating bath which is applied to the strip material. Thus, as the strip is wrapped about the core, insulation is dispersed between each wrap of the wrapping, and this assists during the welding process to assure that only the outer two wraps are welded together.

The subjection of the magnetizable wrap material to the insulating bath constitutes an important step in the manufacturing process. The most promising results were obtained by a dispersion of magnesium oxide, in a dispersing medium of toluene (toluol) or of an oil composition, preferably of similar volatility and other physical properties, although other types of liquid dispersing media and of finely divided inorganic insulating media may be used. An important factor in the quality of the cores was found to be a function of the insulation properties. Thus, by increasing the weight percentage of the magnesium oxide in the dispersing medium, the switching time was significantly shortened and the squareness ratio was substantially improved. In determining this it was discovered upon close examination that the wraps of thinly insulated cores would weld together from the heat of the annealing treatment when an inadequate insulating layer was provided. However, cores insulated in the manner described hereinafter were found to be singularly free of welds other than the intended single weld 23 on the outer free end of the wrap. Therefore, it is concluded that, although a thin insulating layer is required between the wraps, it must be dense enough to prevent the diffusion of metal particles between neighboring wraps resulting in heat welding. The heat of the annealing process is efficaciously taken advantage of to burn the oil out of the insulating mixture and thereby leave a smooth stable inorganic insulation layer disposed between the wraps of the strip wrapped core.

The thickness of the mixture is very carefully controlled by wrapping the cores at a constant tension such as may be provided by the winding and reeling mechanism of the machine of Fig. 3. In this manner a controlled thickness of the insulation material may be left on the surfaces of the wrap, the excess being squeezed out at the edges of the strip wrapped tape. This is an important step of the process since the excess material at the edges of the tape serves to prevent the welding caused by drooping or other physical contact during the annealing process.

Figure 5:
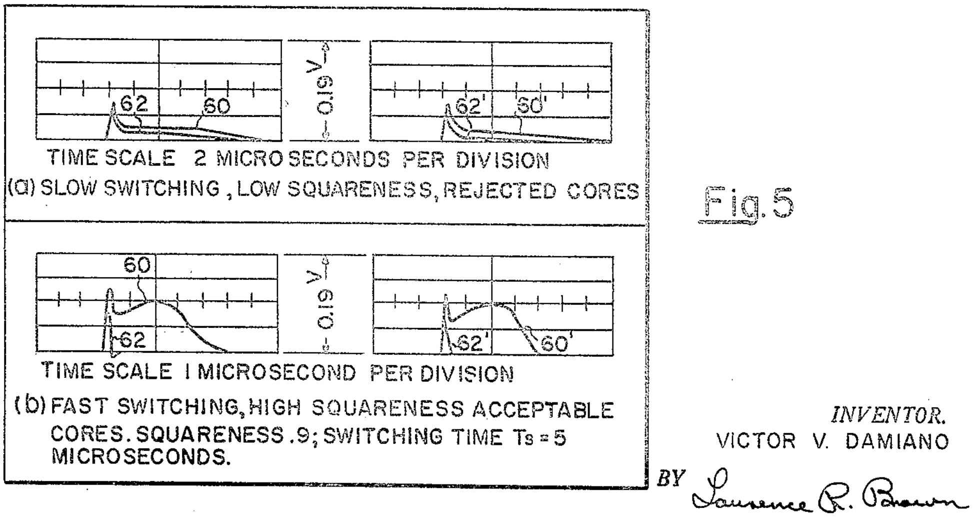
Fig. 5 is a waveform diagram of test patterns indicating properties of magnetic cores.

A visual indication of the properties of manufactured cores is shown in the waveform diagrams of Fig. 5. These diagrams are identified by explanatory text in the drawing, and represent waveforms as seen on the face of an accurately calibrated oscilloscope. Tests of two different cores are shown in separate waveform patterns in Fig. 5*a*. As is evident in Fig. 5*a*, an upper curve 60 is obtained in each pattern which has a very slow switching speed in the order of 12 microseconds, as represented from the beginning to the end of each waveform. The ratio of areas between the upper waveform 60 and the lower waveform 62 is an indication of the core squareness. It is seen from Fig. 5*a* that a very low and undesideable squareness ratio results in the two cores under test. This is typical of the indications of a core which has not been properly manufactured or which had been damaged during the manufacturing process.

However, in Fig. 5*b* the waveforms indicate typical characteristics of acceptable cores having a squareness ratio of about .9 and a switching time of about 5 microseconds. It is readily seen that the ratio of areas underneath curves 60 and 62 is large and that the switching takes place in a much shorter time interval. Oscillograph patterns of this type displaying core characteristics are obtained by means well known in the art. For example, reference may be made to U.S. Patent No. 2,679,025 issued to J. A. Rajchman.

Figure 6:
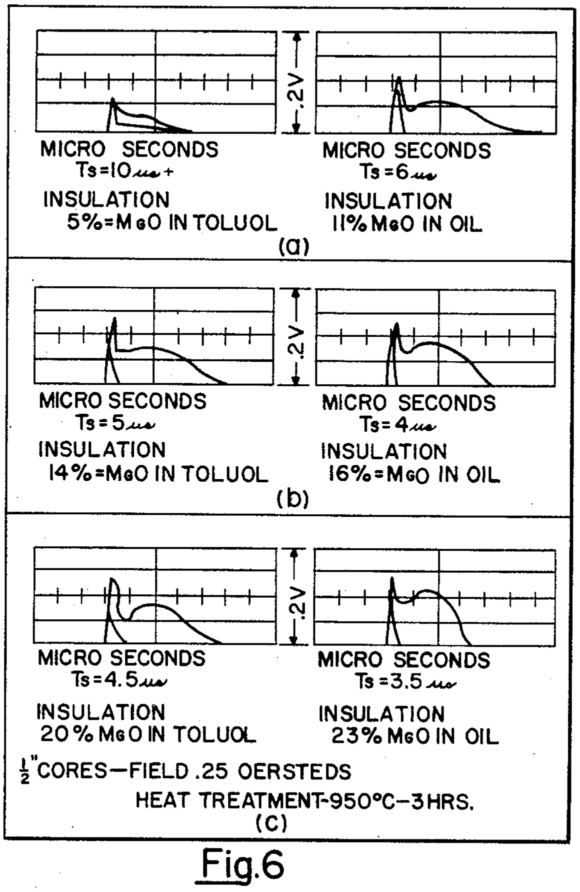
Fig. 6 is a waveform diagram illustrating the effect of insulation between strip wraps upon the properties of cores processed in accordance with the invention.

The waveform test patterns of Fig. 6 illustrate the effect of changing the percentage of magnesium oxide in the dispersing medium. It is seen that acceptable cores result when a percentage of about 15% or above of magnesium oxide by weight is used in the oil dispersing medium.

After the cores are properly insulated, wrapped and welded like core 24 of Fig. 2, they are annealed in an accurately controlled process which is described hereinafter in connection with the furnace and the gas supply system disclosed in Figs. 7 and 8 respectively. In general, it has been found that longer heat and higher temperature decrease the switching time. In a 50–50 grain oriented core, a higher temperature will also increase the squareness. However, higher temperatures and longer time tend to break down the insulating layers between the wraps and result in more failures and thereby more costly cores so that it is in general desired to keep the temperature as low as possible and the heating time as short as possible for producing good cores. It has been found that different core properties may be obtained by accurate control of the annealing process, and that by rigidly controlling the annealing process, cores may be made with predetermined switching times and squareness ratios. Examples of time temperature specification of the heat treatment are listed as follows: (1) For a ¼ mil molybdenum Permalloy core having 10 wraps a temperature of 900° C. is held for one hour to produce acceptable cores. (2) For a ⅛ mil molybdenum Permalloy core having 10 wraps a higher temperature of 1000° C. is held for a temperature of one hour.

During the heat treatment a furnace is required for producing temperatures up to about 1200° C. As before stated, impurities in the metallic core can materially alter the desired magnetic properties and therefore careful control of impurities must be obtained during the annealing process. For this purpose the furnace should be operable in a hydrogen atmosphere, and accordingly a tube furnace such as that illustrated in Fig. 7 appears desirable. Because a quenching and cooling cycle will be important to the properties of the cores as will appear in more detail hereinafter, a portion of the furnace should extend beyond the hot zone so that core specimens may be rapidly cooled while maintained in the same hydrogen atmosphere.

Figure 7:
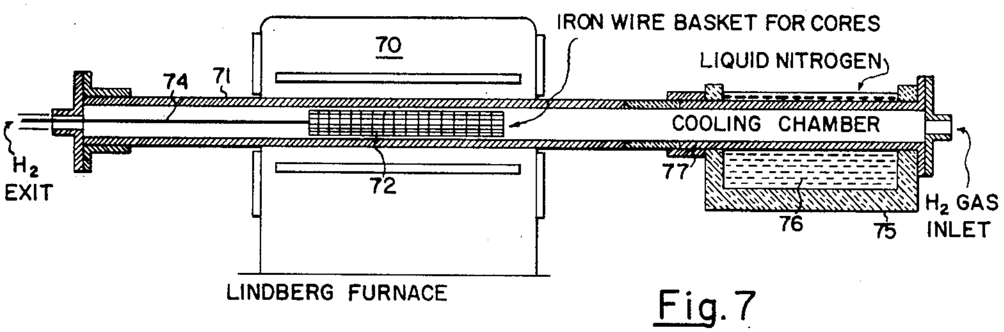
Fig. 7 is a diagrammatic view of a furnace used for annealing cores in accordance with the invention.

The heating apparatus in which the cores are treated is generally indicated at 70 in Fig. 7. A suitable electrical heating apparatus for this purpose is known in the trade as a Lindberg furnace. Extending through the furnace and projecting from the opposite sides thereof is a tubular member 71. Reciprocably movable in the tube 71 is a basket 72 formed of heat resistant material such as iron wire. The cores to be treated are placed in the wire basket 72 for heating in the furnace 70. By means of the extended handle 74 leading through one end of the tube 71 the basket containing the cores may be pushed directly into a cooling chamber at the opposite end of the tube for a controlled quenching cycle. The cooling chamber may contain a quick cooling medium 76, such as liquid nitrogen. In this case the supply of liquid nitrogen is maintained in contact with the end section 77 of the tube which enters the cooling chamber. Some other coolant such as water may be used when the quenching cycle is to take place during a longer time interval. The liquid coolant 76 in physical contact with the heat conducting tube 77 will produce a controlled quenching cycle which may be successively repeated for different batches of cores.

Figure 8:
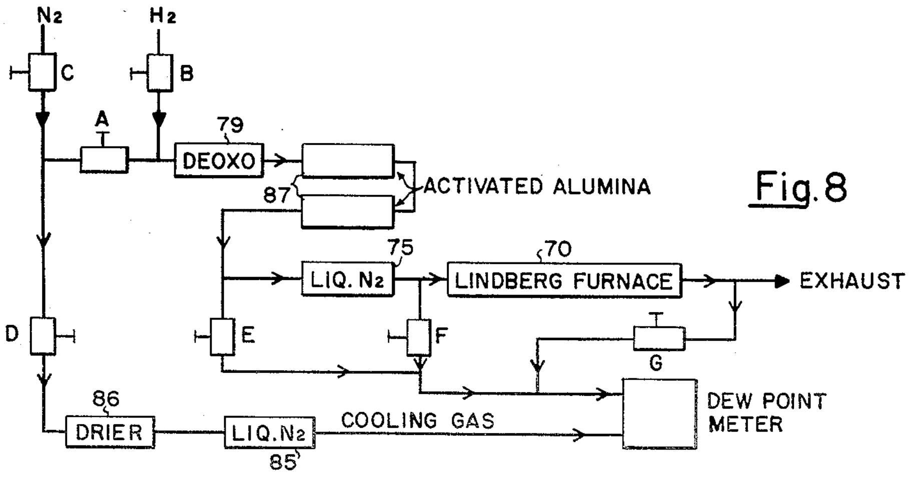
Fig. 8 is a flow chart of a system for providing a gaseous atmosphere during processing of the cores.

The gas purification train schematically represented in Fig. 8 serves to initially flush the furnace with nitrogen and thereafter provide a hydrogen atmosphere. Initially, nitrogen is used to flush all residual air from the system by closing valves B and D and opening valves A and C. Hydrogen is then continuously passed through the system by closing valves A and C and opening valve B. The cores are thus subjected to a hydrogen atmosphere both in the heating furnace and the cooling chamber. Valves D, E, F and G are normally closed. In order to accurately control the removal of impurities or prevent the formation of impurities in the cores during the annealing process, accurate control of the dew point of the hydrogen atmosphere is desirable. Thus, dew point measurements may be checked at valves E, F and G. By opening valves E, F or G and also opening valve D to permit the two gas streams to flow through the dew point meter, measurements may be taken. The comparison cooling gas stream has water removed in drier 86 and is cooled by bubbling through a liquid nitrogen bath 85.

The system described has resulted in lowering the dew point from −72° F. at valve E to −92° F. at valve F. The liquid nitrogen tank 75 may thus be used to successfully lower the dew point of the hydrogen by about 20° F. before it enters the annealing furnace 70. One of the desirable conditions found for annealing the cores is an entrance dew point at valve F of the furnace at least as low as −60° F. (−50° C.) and exit dew point at valve G not higher than −40° F. Oxygen is removed from the hydrogen atmosphere by the unit 79 designated "Deoxo" in Fig. 8, which consists of a palladium catalyst for combining oxygen with hydrogen to form water. This device is capable of removing the oxygen to one part per million parts of gas. Water is removed by the activated alumina devices 87.

Figure 9:
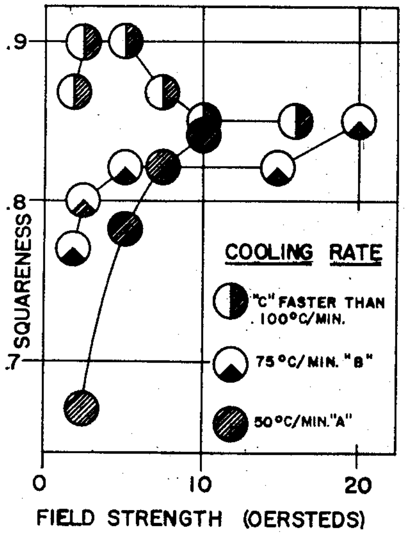
Fig. 9 is a graph indicating the effect of cooling rate upon the characteristics of certain cores produced in accordance with the invention.

Fig. 9 indicates the effect upon the squareness produced by the cooling step. The magnetic properties of molybdenum Permalloy cores for several different cooling rates are indicated on the graph. It is noted that the cooling rate is critical both for obtaining squareness and switching time in molypermalloy cores but is not as pronounced for 50–50 cores. Apparently, the cooling rate has considerable effect upon the crystal ordered structure of the Permalloy material. As hereinbefore discussed, it is desirable to provide a Permalloy having about 4% molybdenum content in order to make the material less critical to the cooling rate. Without the molybdenum content, it is necessary to quench the cores at a much faster rate through the Curie temperature than otherwise. Therefore the cooling rate of molypermalloy is much less critical. It is seen from the chart of Fig. 9 that with a cooling rate "C" faster than 100° C. per minute, all the squareness readings were high. The system for cooling at the rate "C" may be obtained from a system as shown in Fig. 7 modified to the extent that the liquid nitrogen level is below the heat conducting surface 77 at the end of the furnace and the surface 77 is cooled from copper coils wound about the surface 77 with only the ends dipped in the liquid nitrogen. The cores processed at the cooling rate "C" exhibited very high squareness ratios as compared with the corresponding slower cooling rates of "B" and "A," which might be obtained respectively, for example, by cooling in a water jacket cooling chamber and by cooling the cores in air at room temperature. It appears important during this process that the cores should be given a relatively rapid cooling rate through the Curie temperature to exhibit the desired properties and preferably at rates of, or greater than, 100° C. per minute.

Figure 10:
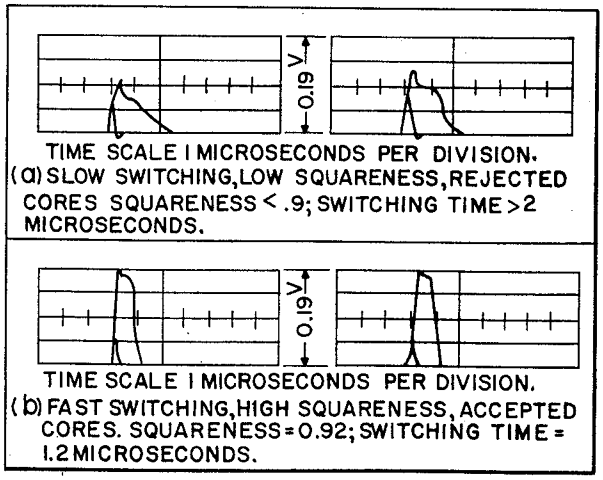
Fig. 10 is a waveform diagram of test patterns of core properties attainable in accordance with the teachings of the present invention.

The test waveforms of Fig. 10 indicate the tolerances which may be held within very closely defined limits by choosing and carefully controlling the different process steps hereinbefore described. Switching times in the order of 1.2 microseconds and squareness ratios in the order of .92 may be consistently obtained by the foregoing process. It has been found that tolerances in switching times of plus or minus 15%, squareness ratios of plus or minus 10% and a flux change of plus or minus 15% may be specified with production under the foregoing method steps and result in a 95% acceptable yield. As seen in Fig. 10*b* the flux amplitude of the core is measured at about 0.19 volt, whereas in Fig 10*a* it appears to be only about 0.10 volt. This is a test indication of the amount of signal which will be obtainable from the core when it is switched from one storage condition to another. This property also depends upon the core processing and may be held within a range of about 15% by the foregoing process.

The following two charts give an indication of the effect of the heat treatment and cooling rate (C.R.) on different molybdenum Permalloy cores:

¼-MIL., 4–79 MOLYBDENUM PERMALLOY 10 WRAP CORES .25 OERSTED FIELD

| Heat treatment and Cooling rate | $B_r/B_s$ | $T_s$, Microsecond |
|---|---|---|
| 900° C., 2 hrs., C.R. "A" | .67 | Did not switch. |
| 900° C., 2 hrs., C.R. "A" | .71 | Did not switch. |
| 900° C., 2 hrs., C.R. "B" | .80 | 8. |
| 1,000° C., 2 hrs., C.R. "C" | .92 | 7. |
| 1,000° C., 2 hrs., C.R. "C" | .90 | 6.5. |
| 1,000° C., 2 hrs., C.R. "C" | .91 | 7. |
| 900° C., 1 hr., C.R. "D" | .92 | 5. |
| 900° C., 1 hr., C.R. "D" | .92 | 5. |

⅛-MIL., 4–79 MOLYBDENUM PERMALLOY 10 WRAP CORES, 0.5 OERSTED FIELD

| Heat treatment and Cooling rate | $B_r/B_s$ | $T_s$, Microsecond |
|---|---|---|
| 1,000° C., 1 hr., C.R. "C" | .8 | 5. |
| 1,000° C., 1 hr., C.R. "C" | .90 | 2.4. |
| 1,000° C., 1 hr., C.R. "C" | .86 | 2.5. |
| 1,000° C., 1 hr., C.R. "D" | .93 | 2.2. |
| 1,000° C., 1 hr., C.R. "D" | .93 | 2.4. |
| 1,000° C., 1 hr., C.R. "D" | .90 | 2.6. |

In these tables the cooling rate D is represented by the liquid nitrogen contact produced by the cooling chamber shown in Fig. 7 and is estimated to be at close to 1000° C. per minute.

It is evident from the foregoing discussion that magnetic cores may be manufactured within very close specifications by means of the method steps set forth in the specification. The present manufacturing procedure therefore permits a high yield of improved bistable state cores not heretofore attainable with known methods of the prior art. Having, therefore, described the invention, those features believed descriptive of its novel features are defined in particularity in the appended claims.

What is claimed is:

1. The method of manufacturing a strip wrapped magnetic core exhibiting a substantially square shaped hysteresis characteristic which includes the steps of applying a viscous excess of an insulating material flowable under pressure to at least one surface of a magnetic strip having the aforesaid hysteresis characteristic, successively wrapping turns of the magnetic strip with the excess insulating material thereon about a bobbin while at the same time subjecting the strip to a continuous tension in the direction of its lengthwise dimension to thereby cause each turn of the strip as it is wrapped about the bobbin to exert an inward radial pressure throughout its extent, the pressure developed by said tension being sufficient to squeeze the excess part of the insulating material on each turn of the strip from out of the side edges thereof but without subjecting the strip to excessive mechanical strain, whereby the insulating material is not only uniformly spread between the wrapped turns of the strip on the bobbin but also along the side edges of the turns to prevent heat welding of the edges of the turns to one another during a subsequent heat treatment of the strip wrapped magnetic core.

2. The method of manufacturing a magnetic core from thin strip magnetic material exhibiting a substantially square shaped hysteresis characteristic which includes the steps of applying to the surfaces of such a magnetic strip having the aforesaid hysteresis characteristic an excess of a viscous insulating material flowable under pressure and comprising a dispersion of 15% or more of heat resistant solid particles in a vaporizable liquid carrier, successively wrapping turns of the magnetic strip with the excess insulating material thereon about a bobbin while at the same time subjecting the strip to a continuous tension in the direction of its lengthwise dimension to thereby cause each turn of the strip as it is wrapped about the bobbin to exert an inward radial pressure throughout its extent, the pressure developed by said tension being sufficient to squeeze the excess part of the insulating material on each turn of the strip from out of the side edges thereof but without subjecting the strip to undue mechanical strain and thereby to spread the insulating material not only uniformly between the wrapped turns of the strip on the bobbin but also along the side edges thereof, spot-welding only the outer extremity of the wrapped magnetic strip to the next adjacent turn of the strip to hold the same from unravelling, and subjecting the strip wrapped magnetic core to a heat treatment at temperatures high enough to vaporize the liquid carrier of the insulating material.

References Cited in the file of this patent

UNITED STATES PATENTS

| | | |
|---|---|---|
| 1,667,746 | Smith | May 1, 1928 |
| 2,219,182 | Granfield | Oct. 22, 1940 |
| 2,394,047 | Elsey et al. | Feb. 5, 1946 |
| 2,477,350 | Somerville | July 26, 1949 |
| 2,484,214 | Ford et al. | Oct. 11, 1949 |

UNITED STATES PATENT OFFICE

CERTIFICATE OF CORRECTION

Patent No. 2,914,840

December 1, 1959

Victor V. Damiano

It is hereby certified that error appears in the printed specification of the above numbered patent requiring correction and that the said Letters Patent should read as corrected below.

Column 10, line 16, for "a viscous excess of an" read -- an excess of a viscous --.

Signed and sealed this 16th day of August 1960.

(SEAL)
Attest:

KARL H. AXLINE
Attesting Officer

ROBERT C. WATSON
Commissioner of Patents